United States Patent [19]

McLoughlin et al.

[11] Patent Number: 4,496,616
[45] Date of Patent: Jan. 29, 1985

[54] STRIP OF HEAT-RECOVERABLE ARTICLES

[75] Inventors: Robert H. McLoughlin, Highworth, nr. Swindon; Stanley W. Kirkham, Swindon, both of England

[73] Assignee: Raychem Limited, England

[21] Appl. No.: 358,496

[22] Filed: Mar. 15, 1982

[30] Foreign Application Priority Data

Mar. 23, 1981 [GB] United Kingdom ............. 8109047

[51] Int. Cl.$^3$ .............................................. B32B 3/12
[52] U.S. Cl. ........................................ 428/36; 428/43; 428/178; 428/188; 428/913; 174/DIG. 8
[58] Field of Search ............... 428/43, 54, 188, 195, 428/178, 35, 36, 913; 174/DIG. 8; 156/86; 264/571, DIG. 71, 342 R, 230

[56] References Cited

U.S. PATENT DOCUMENTS

| | | |
|---|---|---|
| 2,027,962 | 3/1933 | Currie . |
| 3,086,242 | 4/1963 | Cook et al. . |
| 4,232,068 | 11/1980 | Hoh et al. ............................ 428/43 |
| 4,342,800 | 8/1982 | Changani et al. ..................... 428/36 |
| 4,374,880 | 2/1983 | Mesnel ............................. 428/43 X |
| 4,376,798 | 3/1983 | Diaz ............................... 428/188 X |
| 4,425,390 | 1/1984 | Changani et al. ............... 264/230 X |

FOREIGN PATENT DOCUMENTS

| | | |
|---|---|---|
| 0022896 | 2/1980 | European Pat. Off. . |
| 990235 | 7/1961 | United Kingdom . |
| 1010064 | 10/1961 | United Kingdom . |
| 965809 | 3/1962 | United Kingdom . |
| 1046367 | 2/1964 | United Kingdom . |
| 1116878 | 8/1965 | United Kingdom . |
| 1284082 | 8/1968 | United Kingdom . |
| 1286460 | 10/1968 | United Kingdom . |
| 1294665 | 1/1969 | United Kingdom . |
| 1292810 | 7/1969 | United Kingdom . |
| 1334556 | 11/1971 | United Kingdom . |
| 1357549 | 11/1971 | United Kingdom . |
| 1433849 | 5/1974 | United Kingdom . |
| 1478535 | 6/1974 | United Kingdom . |
| 1546609 | 5/1976 | United Kingdom . |
| 1603205 | 4/1977 | United Kingdom . |
| 2027390 | 7/1978 | United Kingdom . |
| 2030514 | 7/1978 | United Kingdom . |
| 3746878 | 9/1978 | United Kingdom . |
| 8024621 | 7/1980 | United Kingdom . |
| 8024622 | 7/1980 | United Kingdom . |
| 8030020 | 9/1980 | United Kingdom . |
| 8123069 | 7/1981 | United Kingdom . |

Primary Examiner—Alexander S. Thomas
Attorney, Agent, or Firm—James W. Peterson

[57] ABSTRACT

A strip of hollow heat-recoverable articles formed side-by-side by tear welding two lengths of polymeric material together at intervals so that individual articles may be torn off. A preferred method of making the strip involves cross-linking after the tear welding, heating the strip, and inflating the hollow articles to render them heat-recoverable by introducing pressure via an interconnecting passage formed for that purpose during the tear welding.

9 Claims, 12 Drawing Figures

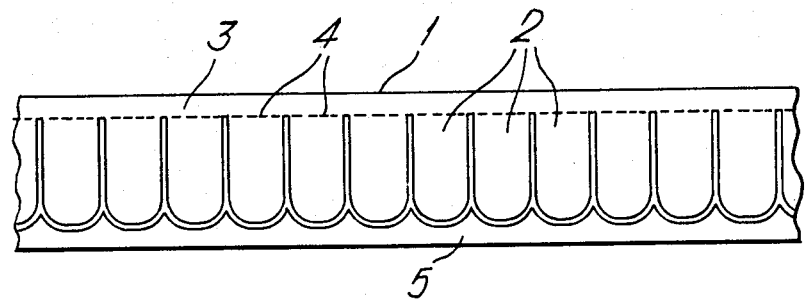
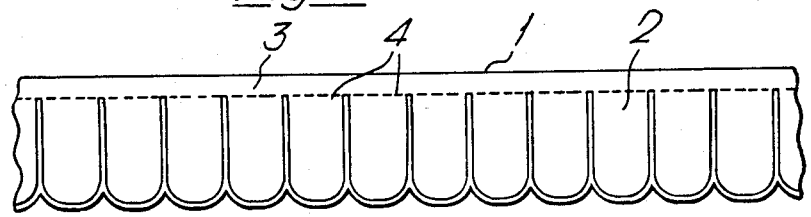
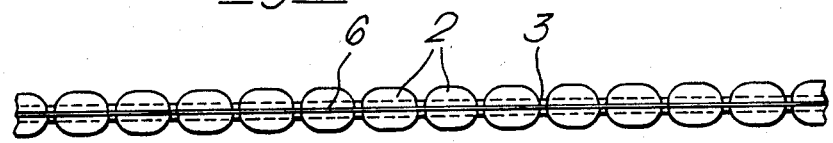
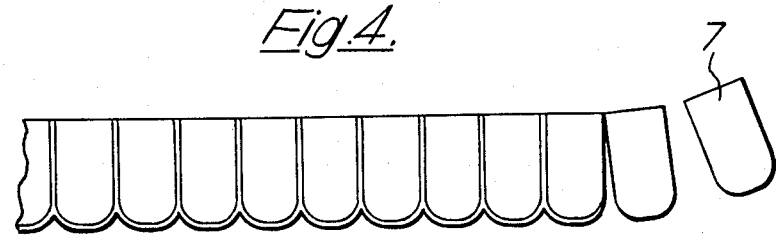

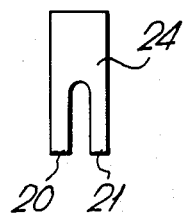
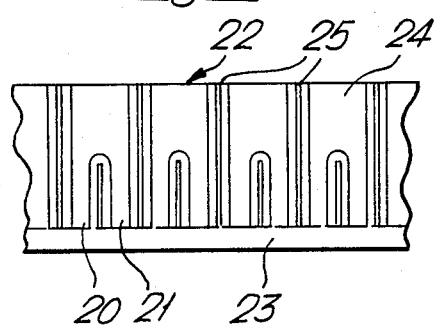
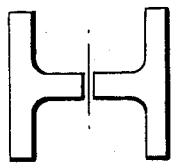
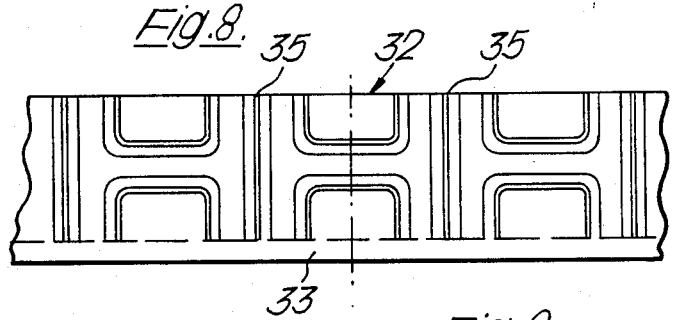
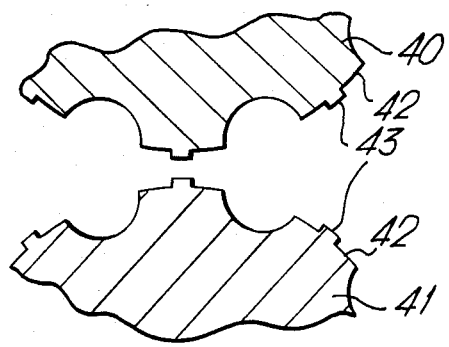

STRIP OF HEAT-RECOVERABLE ARTICLES

The present invention concerns a strip of hollow heat-recoverable polymeric articles, that is to say, hollow articles the dimensional configuration of which may be made to change by subjecting to heat, and to a process for the manufacture of such a strip of articles.

Hitherto, for example as described in U.S. Pat. No. 2,027,962 (Currie) and U.S. Pat. No. 3,086,242 (Cook et al.), hollow heat-recoverable articles have generally been produced by forming a polymer into the desired heat stable configuration, simultaneously or subsequently crosslinking the polymer in its heat stable configuration, heating the cross-linked article to a temperature above the crystalline melting point or softening point of the polymer, deforming the article and cooling the article whilst in the deformed state so that the deformed configuration is retained. In use, since the deformed state of the article is heat unstable, application of heat will cause the article to revert or tend to revert to its original heat stable configuration.

When hollow articles are of such configuration that they cannot be produced directly by extrusion, for example electrical boots, udders (a term employed herein in a general sense to cover any hollow heat shrinkable article comprising at least three outlets employed in the termination of electrical cables and also commonly referred to as cable "breakouts") or end-caps (a hollow tubular article having a smoothly tapering sealed end) for electric cables, then hitherto such articles have generally been formed into the desired heat stable configuration on an item-by-item basis by moulding, e.g. by injection, compression or transfer moulding techniques.

Quite apart from the added expense of such techniques, for complicated shapes, e.g. udders, distortion may be necessary to remove the articles from the moulding pin or core requiring that the articles be resiliently deformable. Furthermore, in order to render such articles heat-recoverable, such moulded parts have in general hitherto been heated and deformed into a heat unstable configuration on an item-by-item basis.

A process for producing heat-shrinkable cable end caps by pinching a tube of thermoplastic polymeric material at intervals, followed by needle injection of air to expand each individual sleeve thus formed, and cutting of the expanded sleeve to form the finished end caps is described in British Pat. No. 1,334,556.

The present invention provides an ingeniously improved method for making a strip of heat-recoverable articles, especially cable end caps, and a highly convenient end product comprising a strip of heat recoverable articles preferably made by that method.

The invention accordingly provides a method of manufacturing a strip of heat-recoverable articles comprising (a) bonding together at intervals two superposed lengths of thermoplastic polymeric material so as to form a series of compartments separated by elongate bonded areas extending transversely of the strip and interconnected by a passage extending along the strip, (b) cross-linking the polymeric material, (c) heating the polymeric material and producing a pressure difference between the compartments and the atmosphere via the said passage thereby expanding the compartments to an extent which will render the polymeric material, after cooling, heat recoverable, (d) cooling the polymeric material to fix it in the expanded heat recoverable state, and (e) subsequently removing the portion of the strip containing the said passage, thereby forming an opening to the exterior of each article.

The lengths of polymeric material to be bonded, preferably fused, together may for example comprise two discrete and separate polymeric webs, the two flaps of a longitudinally folded polymeric web or the two sides of a collapsed polymeric tube.

By the expression "fusing together" as employed herein is meant a process wherein the materials in the parts to be fused together are caused to flow together, e.g. welding by heat, solvent or ultrasonic or radio frequency energy, preferably with the application of pressure, to form a homogeneous bridge between the parts in the absence of any discernible interface therebetween.

By "substantially non-cross-linked" polymeric materials as employed herein is meant not cross-linked to the extent that the material cannot be readily bonded to itself or to another polymeric component by fusing. In general, the level of cross-linking in the polymeric material expressed in terms of gel content (ANSI/ASTM D2765-68) is preferably less than 40%, more preferably less than 20%, particularly less than 5%. When cross-linking in accordance with the process, preferably gel contents of at least 40%, e.g. at least 50%, particularly at least 65% are attained.

Of particular interest is a process whereby the lengths of superimposed polymeric material to be fused together are at a temperature at or above the crystalline melting point or softening point of the polymer, for example, less than 20° C., more preferably less than 15° C., especially less than 10° C. above the crystalline melting point or softening point of the polymer, which, as will be appreciated, are typical of the temperatures of such materials shortly after issuing from an extruder. It is for this reason that the process of invention preferably includes in-line extrusion of the polymeric lengths prior to the fusion step. When the lengths of polymeric material at such temperatures are employed, then it has been found that the fusion step is facilitated and may be accomplished by the application of localised pressure if necessary with further heating.

Hollow heat-recoverable articles produced by the process of the invention also form part of the present invention. The process is particularly useful in the manufacture of heat-recoverable boots, transitions, udders and end-caps for electrical applications, e.g. electrical cables, the use of such products being extensive and well reported in the literature e.g. Proc. IEE 1970, 117(7), 1365–1372 as well as the products described in British Patent Application No. 80.24621 the disclosure of which is incorporated herein by reference. Such products may, for example, be produced in accordance with the process of the invention by welding together at least two super-imposed prestretched polymeric webs, or the two super-imposed flaps of a single folded prestretched polymeric web or the superimposed sides of a pre-stretched and flattened polymeric tube. In the case of e.g. boots, udders and end-caps, the direction of heat shrinkability is preferably radially inward in relation to the substrate to which they are applied and, more preferably, in the substantial absence of shrinkage longitudinally in relation to said substrate.

Hollow heat recoverable articles produced in accordance with the process of the invention may advantageously be coated internally with an adhesive or sealant, in analogous manner to that described and claimed in U.K. Application No. 80.24622 filed on the July 8, 1980, e.g. an adhesive such as a hot-melt adhesive or a sealant (such as described in U.K. Pat. No. 1,116,878 the disclosure of which is incorporated herein by reference). The application of the adhesive or sealant may be effected before, during, or after the process of the invention by appropriate choice of adhesive or sealant and process conditions. For example, a hot-melt adhesive or sealant may be applied to selected parts of the non-cross-linked polymeric materials before the fusion step and thereafter the uncoated parts to be fused together locally heated and pressed together.

Alternatively, the adhesive or sealant may be applied after the fusion step.

If self-adhesion of adhesive or sealant-coated contacting parts is a problem, then such parts may be separated by a non-adherable material such as release paper.

Any cross-linkable polymeric material to which the property of dimensional recoverability may be imparted such as those disclosed in U.K. specification No. 990,235 may be used to form the articles. Polymers which may be used as the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidene fluoride, or other fluorinated polymers or copolymers, e.g. Tefzel (trade name—commercially available from Dupont), elastomeric materials such as those disclosed in U.K. specification No. 1,010,064 and blends such as those disclosed in U.K. specification Nos. 1,284,082 and 1,294,665, and compositions such as those disclosed in our co-pending Applications Nos. 15122/77 and 37468/78. The polymeric materials can be tailored to suit the intended use by the addition of fillers, e.g. semi-conducting fillers or antitracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by gamma radiation or it may be chemically cross-linked. Whichever cross-linking process is used, it may be advantagous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross linking that may be used in the process according to the invention involves grafting an unsaturated hydrolysable silane on the polymer and subjecting the article to moisture during a curing stage, for example, as described in U.K. Patent specification Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond.

As hereinbefore indicated, however, it is preferred that the length of polymeric material to be fused together are at an elevated temperature.

If the heat-recoverable article is produced with an undesired protruding external weld seam, then this may be avoided by turning the article inside out.

As hereinbefore described, the process is particularly appropriate in the production of hollow heat-recoverable articles for use in the electrical field, e.g. boots, udders and end-caps. In general, such products are characterised by a wall thickness before heat-recovery thereof of at least 0.05 mm preferably from 0.1 to 5 mm, especially from 0.5 to 3 mm e.g. 1 to 3 mm. The higher thicknesses may be especially useful for electricity distribution cable end caps, and it has been found surprisingly beneficial in use for even these relatively large articles to be provided as a strip from which individual end caps can be torn off manually. The invention accordingly provides a strip of heat recoverable articles formed by bonding together at intervals two superposed lengths of thermoplastic organic polymeric material, in which strip adjacent articles are connected together by elongate tear welds in the organic polymeric material, the welds extending transversely of the strip and permitting individual articles to be torn off.

It will be understood that "extending transversely" means extending across the strip in such a manner that the individual articles can be torn off by tearing along the line of the tear welds, and this should not be taken to imply any strict alignment or configuration of the welds.

The method of the present invention has the advantage of permitting continuous pneumatic expansion of the compartments to form expanded articles, rather than the undesirably complicated individual needle expansion used previously. Preferably, the bonding together of the strips is effected so as to provide the aforementioned tear weld between adjacent sleeves, with the advantage that the articles can be conveniently torn off one at a time. Preferably, the interconnecting passage is trimmed off after expansion to leave the articles with an open end, and the other end of the articles may be trimmed off also to provide two open ends. When single open ends are desired, for example to form end caps, the closed end of each article may be welded to provide a desired shape, and if tear welds are used the resulting waste material may be conveniently torn off. Preferably, the design is arranged so that the waste may be torn off in a continuous strip.

It is preferred to perform the cross-linking after the welding together of the lengths of polymeric material but before the expansion step, so as to increase the weld strength and facilitate expansion at temperatures which render the material pliable and easier to expand. Such "hot" expansion is preferred for producing articles which, after cooling, are fixed in an open cross-sectional configuration. Alternatively, cold stretched film could be first welded then cross linked to produce the tear-welded strip of articles as generally described and claimed in our copending British patent application No. 8,123,069. This alternative procedure results in articles having a flat configuration which can be opened by flexing opposed portions of the lengths of polymeric material.

Embodiments of the invention will now be described by way of example with reference to the accompanying drawings, wherein:

FIG. 1 shows in plan view a tube of thermoplastic polymeric material which has been transversely tear welded at intervals to form a strip of compartments lying transversely of the strip;

FIGS. 2 and 3 show in plan and end-on view respectively the strip after expansion of the compartments to form expanded sleeves and after removal of the waste strip from the closed ends of the sleeves;

FIG. 4 shows in perspective the strip after cutting off of the expansion passage, to leave a strip of end caps;

FIG. 5 shows a different form of hollow heat-recoverable article removed from a strip according to the invention;

FIG. 6 shows a strip of articles like that shown in FIG. 5 connected by tear welds;

FIG. 7 shows a T-shaped form of hollow heat-recoverable article removed from a strip according to the invention;

FIG. 8 shows a strip of T-shaped articles like that shown in FIG. 7 joined together in pairs by the stem of the T, with adjacent pairs being connected by tear welds;

FIG. 9 shows schematically parts of a pair of tear welding rolls;

Figure 10:
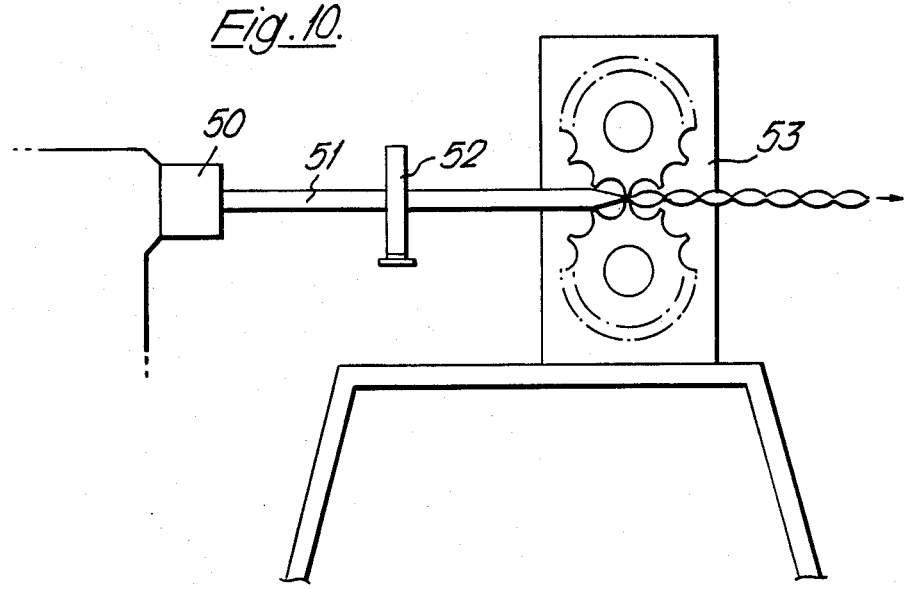
FIG. 10 shows schematically apparatus for producing a strip of articles according to the invention.

Referring to the drawings, in FIG. 1 the thermoplastics tube 1 has been tear welded to form compartments 2 interconnected by a longitudinal passage 3, the inner edge alignment of which is indicated by broken line 4 for clarity.

In FIGS. 2 and 3 can be seen the expanded compartments produced by heating the thermoplastics material, after cross-linking, above its crystalline melting point and introducing fluid pressure via passage 3 to expand the compartments while hot. Subsequent cooling sets the expanded cross-linked sleeves in the expanded state, as is known from the aforementioned U.S. and British Patents. Removal of the waste strip 5 (FIG. 1) leaves tear lines 6 (FIG. 3) around the closed ends of the sleeves.

In FIG. 4, the pressure-conveying passage 3 has been trimmed off to leave open ended caps, one of which (7) is shown torn off.

It will be appreciated that a certain amount of expansion can be imparted to the articles of the present invention by longitudinally stretching the polymeric strip, in addition to the pneumatic expansion. Such stretching expansion must be applied cautiously in the present case in order to avoid tearing the tear-welds prematurely. Stretching expansion is described and claimed in our co-pending patent application number No. 8,030,020.

FIG. 5 shows an udder having two outlets 20, 21, and FIG. 6 shows how such udders can be formed in-line according to the process of the present invention, the edge 22 being sealed, e.g. it may be the folded edge of a strip or tube of polymeric material, at least until after the expansion step, and an inter-connecting passage 23 being provided for the pneumatic expansion, as before. The individual udders 24 can be separated by tearing the tear welds 25, preferably after removal of the part of the strip containing the passage 23, and cutting off of the edge 22 to leave open ends at both ends of the udders.

FIGS. 7 and 8 illustrate the formation of T-shaped articles by the process of the present invention, the articles being formed in pairs as H-shaped tubes, the edge of the strip 32 being sealed at least until after the expansion step, which is effected by introducing pneumatic pressure into passage 33, and the pairs of T-shaped articles joined together in the form of an H may be separated from each other by tearing the tear-welds 35. Cutting of the H-shaped articles to separate the two T's, as indicated by the broken line, is necessary in this case.

FIGS. 9 and 10 illustrate apparatus for carrying out the present invention. FIG. 9 illustrates pressure rolls 40, 41, having pressure surfaces 42 suitable for welding the two lengths of polymeric material together, with projecting surfaces 43 provided to make the necessary line of weakness to form a tear-weld.

FIG. 10 shows schematically a tube 51 of polymeric material leading to extruder 50 and passing via guide-rolls 52 to the embossing or tear-welding unit 53, whereafter the periodically welded tube passes to the beaming and expansion processes (not shown).

Figure 11:
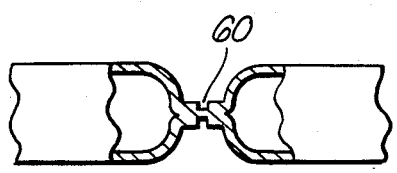
FIG. 11 shows schematically the configuration which might be expected for the tear welds used in the present invention.
Figure 12:
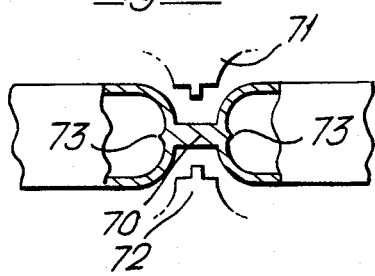
FIG. 12 shows an advantageous weld configuration which has surprisingly been achieved in practice.

Bearing in mind the usual profile of the tear-welding tools shown in FIG. 9, it would normally be expected that a tear-weld would have a profile somewhat like that shown schematically in FIG. 11, with an indented line of weakness 60 midway between the two articles formed by welding. Such a line of weakness distinguishes a tear weld from the kind of flat welded seam produced by, for example, a pair of relatively broad flat platens. However, it has surprisingly been discovered that by suitable selection of the dimensions of the tear welding tool and the spacing of the articles from each other, a tear-weld can in fact be produced having the profile shown schematically in FIG. 12, wherein the bridging weld portion 70 can be seen to have substantially constant thickness. The tear-welding tools 71, 72 have unexpectedly been found to push the polymeric material away from the weld area into the seams 73 of the welded articles, and this has the advantage of reinforcing the weld area of the articles themselves to help that area to withstand the forces of expansion. This is a commercially significant advantage, since undesired failure of the seam during expansion can seriously hamper production.

Suitable dimensions for achieving this desirable effect can readily be determined by trial and error, a suitable example using polymeric material of about 0.7 mm thickness in its normal (recovered) state, being a weld thickness of approximately 0.15 mm, and weld width (between adjacent articles) of about 0.4 mm.

It will be understood that the particular shape of the articles in the strip produced by the present invention is not critical, although more or less straight sided tubular articles of the kind illustrated often prove to be commercially desirable.

We claim:

1. A strip of heat-recoverable articles formed by bonding together at intervals two superposed lengths of thermoplastic organic polymeric material, in which strip adjacent articles are connected together by elongate tear welds in the organic polymeric material, the welds extending transversely of the strip and permitting individual articles to be torn off, the articles being interconnected by a passage extending along the strip which passage is capable of conveying fluid pressure into the articles during expansion thereof.

2. A strip according to claim 1 wherein the polymeric material is cross-linked.

3. A strip according to claim 2, wherein the said articles are in side-by-side relationship along the strip.

4. A strip according to claim 1, wherein the spacing of adjacent articles and the dimensions of the tear weld are such that the part of the tear weld extending between the adjacent articles is of substantially uniform thickness.

5. A strip according to any of claim 1, wherein the two lengths of polymeric material are deformed substantially symmetrically towards each other in the region of the tear weld.

6. A strip according to claim 1, wherein the articles have been deformed at elevated temperature and cooled in the deformed state so as to fix an open cross-sectional configuration therein.

7. A strip according to claim 1, wherein the articles are in a flat configuration which can be opened by flexing opposed portions of the lengths of polymeric material.

8. A strip according to claim 1 wherein the articles are internally coated with adhesive or sealant material.

9. A strip of heat-recoverable articles formed by bonding together at intervals two superposed lengths of thermoplastic organic polymeric material, in which strip adjacent articles are connected together by elongate tear welds in the organic polymeric material, the welds extending transversely of the strip and permitting individual articles to be torn off, each article having at least one opening substantially at the edge of the strip, at least some of the articles comprising two open or flat tubular enclosures having openings substantially at each edge of the strip connected together in "H" formation by a central bridging open or flat tubular enclosure, the bridging tubular enclosure being severable to convert each "H"-shaped article into a pair of "T"-shaped articles.

* * * * *